Patented Feb. 7, 1933

1,896,521

UNITED STATES PATENT OFFICE

ERNST KOMM, OF DRESDEN-WEISSER HIRSCH, GERMANY

PROCESS FOR OBTAINING HIGH-VALUED NUTRIENTS FROM THE PRODUCTS OF CEREALIA AND LEGUMENS

No Drawing. Application filed June 2, 1928. Serial No. 282,507.

The present invention has for its object a process for obtaining high-valued nutrients from the products of cerealia and legumens. The constituents of the peels (bran) and the germs of various cerealia and legumens are taken as the starting-material for the present process. Said products could, notwithstanding their high contents of nutrients and of vitamine, not be used up to now for human food on account partly of their high content of cellulose and partly of their contents of bitter principles.

According to the present invention the high-valued nutrients of said plant products and from the latter extract-substances of high vitamine contents are obtained suitable for the improvement of human foods. For this purpose the components of the peels (bran) and the germs of the various cerealia and legumens very important for the human food are mashed with distilled water of approximately 55 to 65 degrees centigrade and extracted while simultaneously adding diastase ferments whereby the nutrients important for the human nourishment such as albumen, carbohydrates, vitamine or the like are dissolved from said cerealia and legumens. From the simultaneously dissolved not desirable and partially noxious components, the extractive matters are freed partly by strictly maintaining the temperature in the mash-process and partly by a subsequent distillation by steam.

The process can for example be performed in the following manner:

The starting-materials mentioned above of any suitable mixture are inserted into distilled water of fourfold to fivefold quantity and kept in it during six hours at a temperature of about 55 to 65 degrees centigrade while continuously stirring the mixture. Shortly after mashing, barley-malt of about 5 to 10 per cent of the used quantity of the starting material is added to the mixture, the diastase power of said malt being fixed by a preliminary test according to known process. This mashing process, effected under the greatest possible absence of atmospheric air, for example is closed vessels or in an atmosphere of carbonic acid, being finished, the mash-liquid is separated from the remaining solid ingredients by filtration, centrifuging or squeezing procedures. The solid ingredients are lixiviated once more by ordinary water which is separated from the solid ingredients in the same manner as indicated above. The hydrated extracts so obtained contain small quantities of undesired bitter principles (first of all volatile fatty acid) which have to be removed for the reason that they give a disagreeable taste to the finished product and may also sometimes be noxious. These bitter-principles are liable to be volatile with steam. They can therefor be removed from the extract-products by a distillation by water in a chemical-technical sense. According to the purpose required said extract-products can be prepared in liquid, viscid or solid state. If it is intended to maintain them in a liquid state, the distillation by steam must be effected in the usual manner by introducing vapors and drawing off the volatile product of distillation. If it is intended to obtain a viscid or solid extract-product, the liquid accumulating extracts must be brought up to the desired consistency in vacuo at a temperature of about forty degrees centigrade. In this procedure the volatile constituents of bitter priciples are removed for their greatest part together with the vapors of water drawn off. Therefor a preliminary supply of vapors is not necessary and said concentration-process obtain by evaporation in vacuo represents a distillation of steam in the chemical-technical sense. In case a great quantity of bitter-principles is contained in the extract-substances, as may be the case, for instance, by largely using rye-germs, and if said bitter-principles cannot be sufficiently removed by the evaporation-procedure, the liquid extract must, in advance, be treated by water-vapors as described above.

The use of distilled water has, in comparison with the ordinary water, during the mashing-proceduse the advantage that an easier and more voluminous dissolution of the cells of the material-worked-on takes place, due to the hypotony. An increase of the output is effected thereby. Distilled water can be obtained for the present in a technical-economical manner by the electro-osmose-process proposed by Siemens.

A simultaneous increase of the output is obtained by the addition of barley-malt. The great amount of diastase-ferments within said product causes that an essential part of the amylum of the starting materials otherwise not soluble in water is, during the mashing process, fermentatively disintegrated and thereby rendered soluble in water.

It is of importance to maintain, during the mashing-process, the given limits of temperature for the reason that when working at a lower temperature the noxious peroxydase-ferments are not sufficiently destroyed as to their action and that when working at at a higher temperature the activity of the vitamines and the vitasterines is reduced.

The extract-products obtained by the process described contain, in proportion to the starting-materials used, a great amount of easily digestible albumens, carbohydrates and in addition thereto of the various vitamines and vitasterines. The extract-products are suitable as an addition to various foods (as for instance bread, chocolate, cocoa or the like) and to pharmaceutical preparations for increasing their nutrition.

What I claim is:

1. The method of producing a food-product rich in vitasterines as well as in vitamines, comprising taking a grain by-product rich in cellulose and bitter principles, mashing same with water while adding a diastasic substance thereto and retaining the vitasterines, separating the liquid produced thereby, and passing steam through said liquid at a temperature and rate sufficient to volatilize the bitter principle without impairing the activity of the vitasterines and the vitamins.

2. The method of producing a vegetable food-product rich in vitamins, vitasterines, soluble albumens, and carbohydrates, comprising taking rye-germs, mashing same with pure distilled water while adding a diastasic substance thereto in an amount sufficient to fermentatively dissolve the amylum of the rye-germ cells, thus retaining vitasterines in the extract, removing the liquid thereby produced, passing live dry steam through said liquid, and regulating the temperature of said steam high enough to inhibit the action of the peroxydase ferments and volatilize the bitter principles, and low enough to leave the activity of the vitamins and vitasterines unimpaired.

In testimony, that I claim the foregoing as my invention, I have signed my name this 18th day of May, 1928.

ERNST KOMM.